United States Patent [19]
Baumann et al.

[11] Patent Number: 5,760,516
[45] Date of Patent: Jun. 2, 1998

[54] CONDUCTOR BAR FOR A STATOR WINDING OF AN ELECTRIC MACHINE

[75] Inventors: Thomas Baumann, Wettingen; Jorg Oesterheld, Fislisbach, both of Switzerland

[73] Assignee: Asea Brown Boveri AG, Baden, Switzerland

[21] Appl. No.: 751,610

[22] Filed: Nov. 18, 1996

[30] Foreign Application Priority Data

Nov. 18, 1995 [DE] Germany .................. 195 43 122.7

[51] Int. Cl.⁶ .................................................. H02K 3/14
[52] U.S. Cl. .................... 310/201; 310/213; 310/45; 336/187; 336/84 C; 174/34; 174/117 F; 174/117 FF; 174/127
[58] Field of Search ................................ 310/201, 213, 310/45; 336/187, 84 C; 174/34, 117 F, 117 FF, 127

[56] References Cited

U.S. PATENT DOCUMENTS

| | | | |
|---|---|---|---|
| 4,308,476 | 12/1981 | Schuler | 310/45 |
| 4,403,163 | 9/1983 | Armerding et al. | 310/213 |
| 4,453,035 | 6/1984 | Neuroth | 174/106 R |
| 4,707,568 | 11/1987 | Hoffman et al. | 174/103 |

*Primary Examiner*—Steven L. Stephan
*Assistant Examiner*—Karl Tamai
*Attorney, Agent, or Firm*—Oblon, Spivak, McClelland, Maier & Neustadt, P.C.

[57] ABSTRACT

The stator winding of an electrical machine comprises conductor elements which are spaced apart from one another, are electrically insulated from one another and are surrounded over their entire length by common main insulation. The cavities, which are caused by the arrangement on both bar narrow sides of the conductor elements and the main insulation, are filled with an electrically semiconductive compound which, for its part, is covered by an electrically semiconductive strip. In order to provide a smooth bar surface, the electrically semiconductive strip is composed of a fiber-reinforced plastic, which has incisions on alternate sides of the narrow sides of the conductor bar oriented transversely with respect to the bar's longitudinal direction; these incisions are deeper than half the strip width and have a cut width which is on the order of magnitude of the strip thickness.

5 Claims, 2 Drawing Sheets

5,760,516

CONDUCTOR BAR FOR A STATOR WINDING OF AN ELECTRIC MACHINE

BACKGROUND OF THE INVENTION

1. Field of the Invention

The invention relates to a conductor bar for the stator winding of an electrical machine. The conductor bar is composed of conductor elements which are space apart from one another, are electrically insulated from one another and are surrounded over their entire length by common main insulation. The cavities in the bar which are caused by the arrangement of the conductor elements with respect to the main insulation, are filled on both bar narrow sides by an electrically semiconductive compound which, for its part, is covered by an electrically semiconductive layer or strip.

The invention in this case is based on prior art results, for example, U.S. Pat. No. 5,066,881.

2. Discussion of Background

Conductor bars for the stator winding of an electrical machine in the case of relatively large units are composed of conductor elements which are spaced apart from one another and are electrically insulated from one another. These conductor elements are surrounded over their entire length by common main insulation which extends over both winding overhangs or end bow sections, and over the iron section of the stator. The arrangement of the conductor elements produces cavities on the narrow sides of the conductor bundle between the conductor elements and the main insulation. These cavities are normally filled with an electrically semiconductive compound and, for their part, are covered by an electrically semiconductive layer or a corresponding strip.

The edge radius of a conductor bar is normally given by the edge radius of the conductor elements and, in that part of the slot which runs in a straight line, is normally about 0.5 mm. In the case of shear pressures, as are applied in the bends of the winding overhang section, this edge radius can be considerably less than 0.5 mm. In comparison with the flat side of the bar, the electrical field is increased by 3 to 4 times at the edge having an edge radius of 0.5 mm. For this reason, virtually all electrical flashovers during the testing of conductor bars have their origin in the edge region. At the operating voltage, flashover is prevented by generous dimensioning of the thickness of the main insulation. This, in turn, results in the insulation thickness on the flat sides being thicker than electrically necessary, which has a disadvantageous effect on heat dissipation in the case of indirectly cooled stator windings.

In order to reduce the voltage peaks at the bar edges to an acceptable extent, the edge radii would have to be increased to values greater than 1.5 mm. This can be accomplished only by additional machining of the "blank" conductor bar, i.e., before the conductor bar has been provided with the main insulation.

In the case of the electrical machine which is known from U.S. Pat. No. 5,066,881, the conductor bundle, which is constructed from conductor elements which are spaced apart from one another, is provided on its narrow sides with filling material for the purpose of creating a flat surface. This is in order to fill the cavities, which are produced by the spacing between the conductor elements and the main insulation. This intermediate layer of filling material is rounded at the edges. This filling material is covered by a textile layer, which is composed of glass fibers and pyrolized organic carbon compounds, extends around the rounded edges of the filling material layer as far as the top and bottom conductor elements of the conductor bundle, and produces electrical coupling of the said conductor elements to the main insulation. This textile layer has an area conductivity of between 200 ohms and 10 Mohms per unit area. Nothing can be found in U.S. Pat. No. 5,066,881 about rounding radii, and it also contains no statements about the composition of the filling material and its application, or even its rounding. It can, however, be assumed that the rounding radius is in a range which reduces the voltage peak mentioned above. However, it appears to be disadvantageous that a flat surface can be achieved on the bar narrow sides only with difficulty by the known procedure. In addition, the forming and/or subsequent machining of the filling layer for the purpose of defined rounding, which is uniform everywhere, of the bar edges is also rather complicated and costly.

SUMMARY OF THE INVENTION

Accordingly, one object of the invention is to provide a novel conductor bar of the generic type mentioned initially, which has a flat surface on the two bar narrow sides and in the case of which it is possible to apply rounding to the edges of the conductor bundle, using simple means.

This object is achieved according to the invention in that the electrically semiconductive strip is composed of a fiber-reinforced plastic, which has incisions on alternate sides of in the winding overhang section of the conductor bar oriented transversely with respect to the bar's longitudinal direction; the incisions are deeper than half the strip width, having a cut width which is in the order of magnitude of the strip thickness.

Such a conductive strip covers the narrow side of the conductor bundle perfectly and has a flat and virtually smooth surface. As a result of the incisions, the conductive strip can be bent laterally within certain limits and can in this way be matched to the curvatures of the conductor bars in the winding overhang section without major restoring forces and/or twisting. It can be pressed onto the filling material, which is soft in the assembly state, using simple means, and, as a result of these means, all the cavities between the top and bottom conductor elements and the conductive strip are also avoided. In the simplest case, the pressing can be carried out by winding around the bar a band which shrinks when heated and subsequently heating the blank bar; there are isolating films or isolating bands, which likewise shrink when heated, preferably located in between.

The conductive strip can—but need not—be rounded beforehand on its longitudinal edges. However, it has been found to be expedient not to carry out the rounding until after the conductive strip has been fitted. This can be done, for example, using an electrically or pneumatically driven hand-held tool, for example a hand-held milling machine. The smooth surface of the conductor bundle narrow side, which is achieved by the conductive strip, is at the same time used as a defined height guide for the milling tool. It is furthermore advantageous to make the width of the conductive strip 1 to 2 mm narrower than the width of the conductor bundle, so that preforming of the edge is produced just by the filling material which emerges during pressing.

Exemplary embodiments of the invention and the advantages which can be achieved with them are explained in more detail in the following text, with reference to the drawings.

BRIEF DESCRIPTION OF THE DRAWINGS

A more complete appreciation of the invention and many of the attendant advantages thereof will be readily obtained

Figure 1:
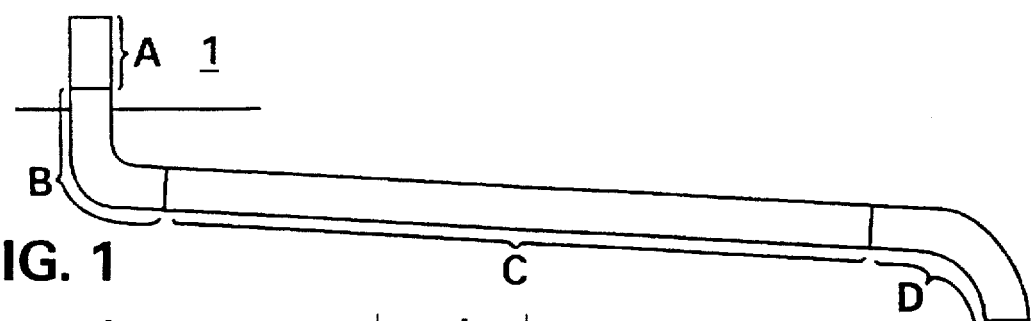
Figure 2:
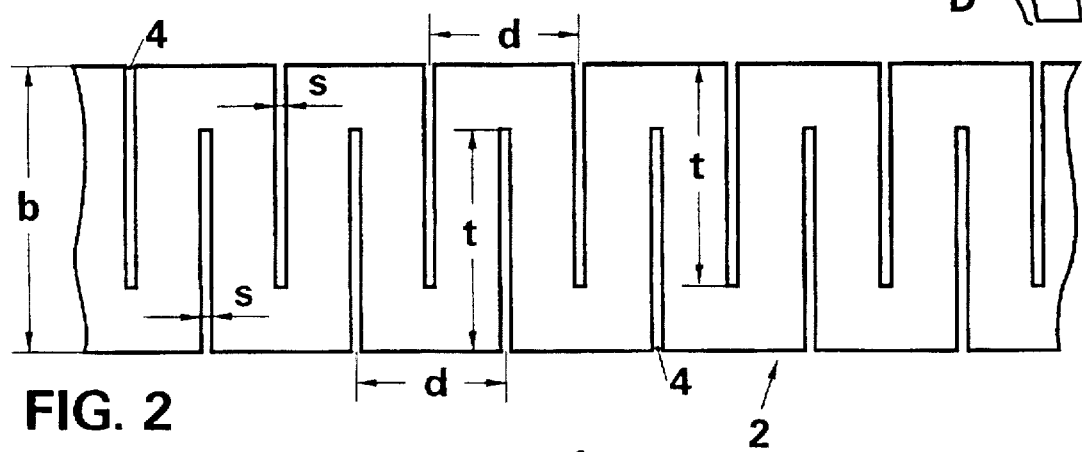
Figure 3:
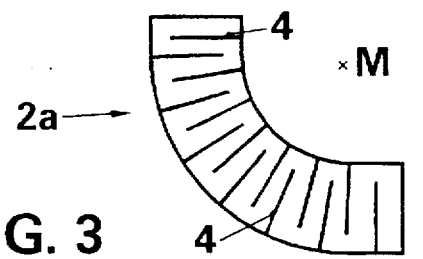
Figures 4, 5, 8, 9:
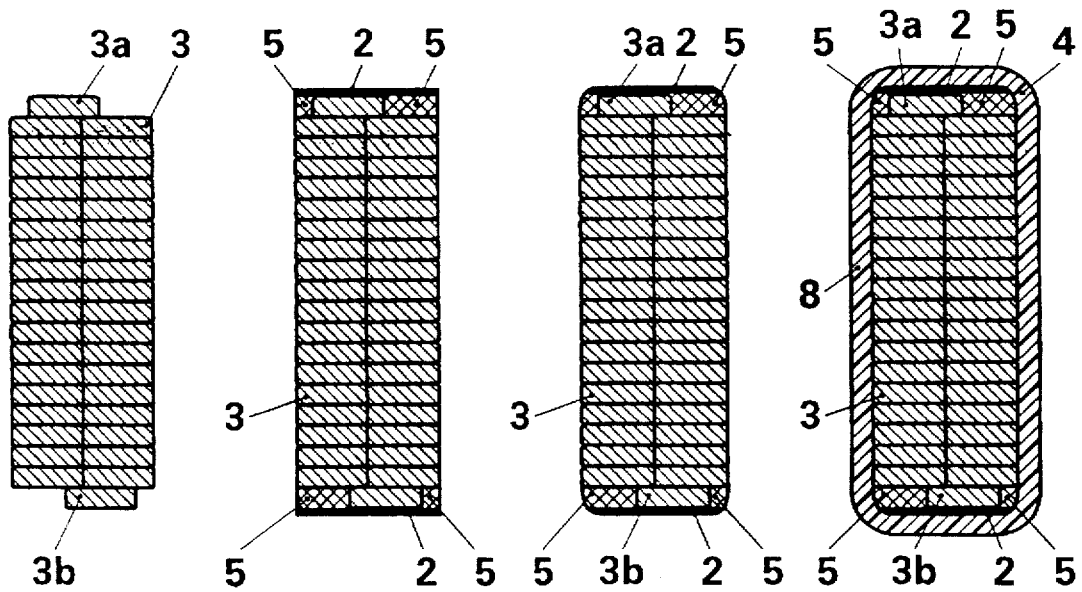
Figures 6, 7:
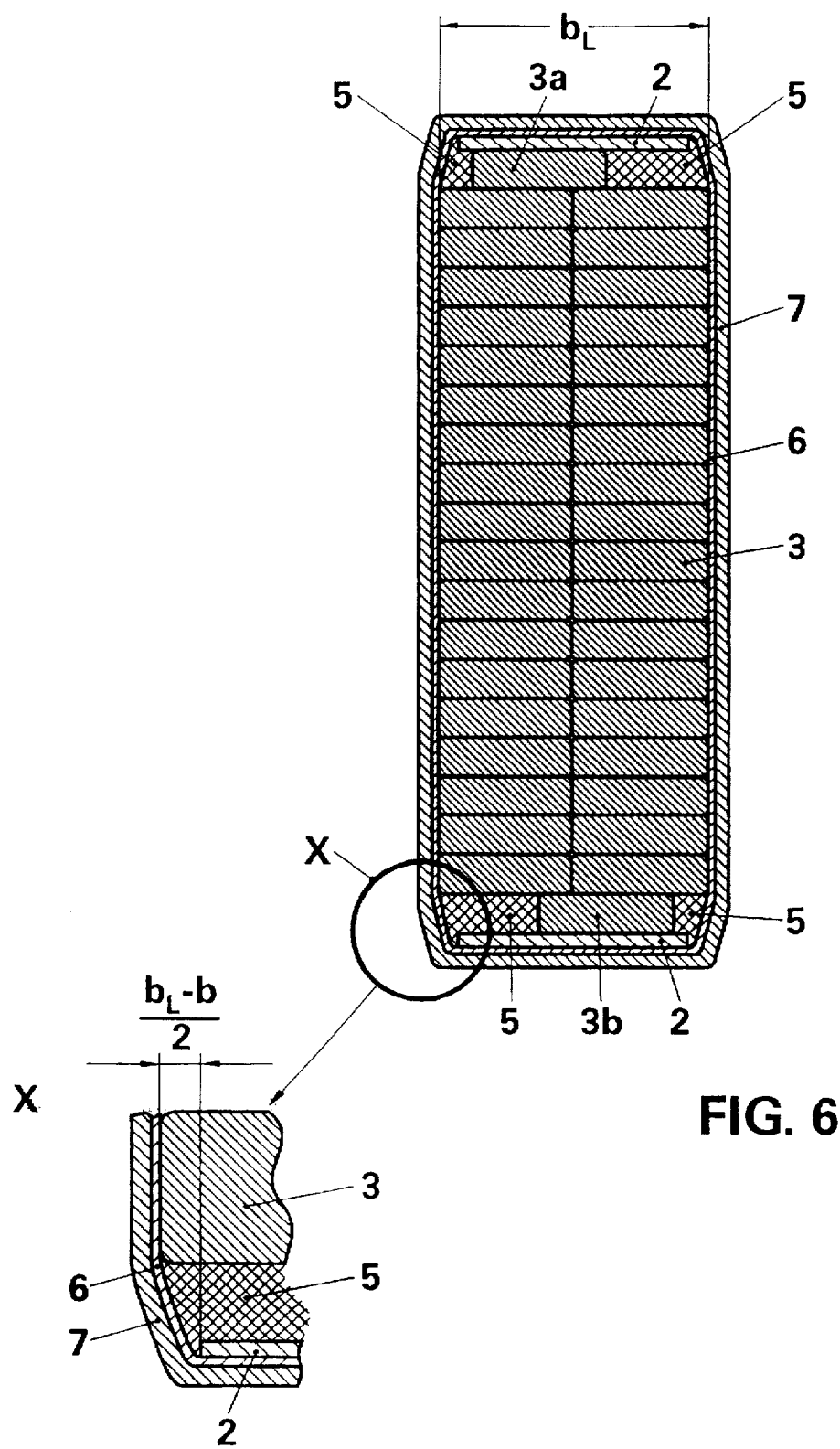

3 as the same becomes better understood by reference to the following detailed description when considered in connection with the accompanying drawings, wherein:

FIG. 1 shows a schematic plan view of the winding overhang section of a conductor bar;

FIG. 2 shows a plan view of a conductive strip as is used for the slightly curved section of the winding overhang;

FIG. 3 shows a plan view of a conductive strip for the slot outlet;

FIG. 4 shows a cross-section through a conductor bundle which is composed of conductor elements;

FIG. 5 shows a cross-section through the conductor bundle according to FIG. 4, with filling material and conductive strips on both bundle narrow sides;

FIG. 6 shows a cross-section through the conductor bundle according to FIG. 5, which is provided with isolating and shrink films for the purpose of pressing and strengthening;

FIG. 7 shows the detail area X from FIG. 6 with an enlarged cross-section of the edge region of the conductive bundle according to FIG. 6;

FIG. 8 shows a cross-section through the conductor bundle according to FIG. 6, after removal of the films and rounding of the edges; and FIG. 9 shows a cross-section through the complete conductor bar, provided with the main insulation.

DESCRIPTION OF THE PREFERRED EMBODIMENTS

Referring now to the drawings, wherein like reference numerals designate identical or corresponding parts through the several views, the stator winding bar of a large electrical machine, e.g., a turbo generator, comprises essentially four sections; a slot or iron part A, a comparatively highly curved section B behind the outlet from the laminated stator core 1, a slightly curved section C which is up to 150 cm or more long and which is in turn followed by a highly curved end section D, where the further connection of the bars takes place.

During the production of the conductor bars, it is of major importance that all the conductor bar surfaces are as flat as possible. This applies in particular to electrical machines having an indirectly cooled stator winding. In the case of these machine types, the heat dissipation from the conductor bar takes place through the laminated stator core, which is provided with radial and/or axial cooling ducts. Thus, flat surfaces in the slot part A are desirable on the bar broad sides and the bar narrow sides. Flat surfaces on the bar broad sides result in good heat transfer properties, and flat surfaces on the bar narrow sides result in optimum wedging in the bar slot. Bar surfaces which are as flat and smooth as possible are also to be aimed for in the winding overhang section. In this case, the cooling effect is less important. However, smooth and flat conductor bar surfaces simplify the installation of the supporting and reinforcing elements in the winding hoverhang.

The invention now comes into play here. With the invention described in the following text, it is possible to achieve flat and smooth bar surfaces without any negative effect on the electrical characteristics of the insulation.

The essential element of the invention is in this case a specially designed conductive strip 2 of, typically, 1 mm thickness and composed of electrically semiconductive hardened glass fabric (HGF). Such hardened glass fabrics are normally composed of glass-fiber-reinforced plastic (GFP), the plastic, for example, epoxy resin, being made electrically semiconductive by means of additives such as soot or graphite. Carbon fibers (CFP) can also be used instead of glass fibers. As will be described in more detail later, these conductive strips 2 are arranged on either end of the conductor bundles, which are formed from transposed conductor elements 3, and the main insulation H. In the iron part A, these conductive strips are simple plates with a width which is 1 to 2 mm less than the width of the conductor bundle.

In the winding overhang, in contrast, i.e., in the sections B, C and, if appropriate, D, the conductive strip 2 has incisions 4 which are alternately located in a transverse orientation with respect to the strips longitudinal direction. The incisions 4 have a depth t which is greater than half the strip width b. The cut width s is typically in the order of magnitude of the strip thickness ($\approx 1$ mm) (see FIG. 2). The distance between the incisions 4, which are introduced alternately from both sides, is in this case governed by the desired lateral curvature. A distance d of 10 to 20 mm between two incisions 4 on one strip side has been found to be adequate for the comparatively slightly curved section C of the bar, the depth t being between 60 and 80% of the strip width b.

In the case of a 50 mm wide conductive strip 2 having incisions 4 designed in such a manner, the otherwise laterally stiff conductive strip can then be bent laterally, as simple mathematical expressions show, through a number of angular degrees to a distance 2 d.

A molding 2a is used in the highly curved section B instead of an elongated conductive strip 2, where molding 2a is matched to the geometry of this section and is composed of the same material as the conductive strip 2, as is shown in FIG. 3. This molding 2a has incisions 4 introduced alternately from both sides in an analogous manner to the conductive strip 2; these incisions 4 point approximately in the direction of the center point M of the circle of curvature and have a depth between 60 and 80% of the molding width.

Under some circumstances, it is possible to dispense with the incorporation of a molding 2a in the eye section D of the conductor bar, provided it is ensured that the potential isolation is completely concluded by this region, i.e., there is only a slight potential difference between the conductor bundle and the insulation surface of the main insulation 8.

It is now intended to sketch the production of a conductor bar according to the invention, in the following text, with reference to FIGS. 4 to 9.

Starting from a conductor bundle (FIG. 4), which is composed of conductor elements 3 which are insulated from one another and are spaced apart from one another, those empty points located close to the outermost conductor elements 3a, 3b on the top and bottom narrow sides of the bundle, respectively, are provided with an electrically semiconductive filling material 5, for example, a conductive glue, and are subsequently covered with the conductive strip 2 and/or the molding 2a. The width b of the conductive strip 2 and/or the molding 2a is, in this case, preferably 1 to 2 mm less than the width $b_L$ of the conductor bundle (see FIG. 7). A shrink band 7 is wound around this bundle, with an isolating film 6 being positioned in between, and is subjected to heat treatment at a raised temperature (120°–150° C.). In this case, the conductive glue 5 is forced into all the cavities which still exist and is solidified. Preforming of the edges takes place at the same time in this case, as is shown in simplified form in FIG. 7. Isolating film composed of shrink film which shrinks in the bundle circumferential direction can also be used in this case to assist the pressing process. It is, furthermore, advantageous if the outwardly directed longitudinal edges of the conductive strip 2 and of the molding 2a are rounded or at least have broken edges. This assists the compression of the bundle during shrinking and also provides a certain preforming of the rounding (which is to be applied later).

After the conductive glue 5 has cured, the binding 6, 7 is removed again, and the edges of the conductor bundle are rounded using a hand-held tool, for example, a pneumatically driven hand-held milling machine, to an edge radius of 2.5±0.5 mm. During this rounding operation, it is very difficult to avoid the outermost conductor elements 3a, 3b also being milled locally. However, the amount of material removed is so small that only an insignificantly small part of the conductor element cross section is affected, so that the current flow through this conductor is virtually unaffected. The milling of the conductor elements 3a, 3b may even be desirable since this results in resistive (not capacitive) electrical coupling of these conductor elements to the conductive strip. It is harmless if the conductor element insulation is also locally damaged during this process since these "bare" points are immediately adjacent to the main insulation 8, which is to be applied later. In this way, a "blank" bar is produced, as is illustrated in cross section in FIG. 8, which is subsequently provided in a known manner with the main insulation 8 (see FIG. 9).

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. A conductor bar for a stator winding of an electrical machine, wherein said conductor bar contains edges and two bar narrow sides, said conductor bar comprising:

common main insulation;

an electrically semiconductive filling material compound;

an electrically semiconductive strip, wherein said electrically semiconductive strip is composed of fiber-reinforced plastic having incisions on alternate sides of a winding overhang section of said conductor bar, said electrically semiconductive strip has outer edges, said incisions are oriented transversely with respect to said conductor bar's longitudinal direction, said incisions being deeper than half of a width of said electrically semiconductive strip and having a cut width which is of the same order of magnitude as the thickness of said electrically semiconductive strip, and said width of said electrically semiconductive strip is 1 to 4 mm smaller than a width of said conductor bar; and a plurality of spaced apart conductor elements, wherein said plurality of spaced apart conductor elements are electrically insulated from one another and surrounded over their entire length by said common main insulation, and wherein spaces between said plurality of spaced apart conductor elements and said common main insulation are filled by said electrically semiconductive filling material compound;

wherein said outer edges of said conductor bar are rounded and said edges of said conductor bar have radii between 2 and 3 mm.

2. The conductor bar in claim 1, wherein edges of said electrically semiconductive filling material compound beneath said electrically conductive strip are rounded.

3. The conductor bar in claim 1, wherein said electrically semiconductive strip is designed in a plurality of parts, and, in a highly curved section of said conductor bar, comprises:

a molding which is roughly matched to said highly curved section of said conductor bar.

4. The conductor bar claim 1, wherein the depth of the incisions is between 60 and 80% of the strip width, and the distance between two adjacent incisions on one side is between 10 and 20 mm.

5. The conductor bar in claim 3, wherein the depth of the incisions is between 60 and 80% of the strip width, and the distance between two adjacent incisions on one side is between 10 and 20 mm.

* * * * *